United States Patent
Sato et al.

[11] Patent Number: 6,053,293
[45] Date of Patent: Apr. 25, 2000

[54] TWO-WAY CLUTCH UNIT

[75] Inventors: Koji Sato, Kakegawa; Masahiro Kawai, Hamamatsu; Makoto Yasui, Kakegawa, all of Japan

[73] Assignee: NTN Corporation, Osaka, Japan

[21] Appl. No.: 08/973,868

[22] PCT Filed: May 7, 1997

[86] PCT No.: PCT/JP97/01532

§ 371 Date: May 7, 1998

§ 102(e) Date: May 7, 1998

[87] PCT Pub. No.: WO97/42427

PCT Pub. Date: Nov. 13, 1997

[30] Foreign Application Priority Data

May 9, 1996 [JP] Japan ................................ 8/115080
May 9, 1996 [JP] Japan ................................ 8/115083

[51] Int. Cl.[7] ................................ F16D 41/06
[52] U.S. Cl. ................ 192/35; 192/54.5; 192/69.82; 192/93 A; 192/43.1
[58] Field of Search ................ 192/35, 54.5, 69.8, 192/69.82, 93 A, 43.1

[56] References Cited

U.S. PATENT DOCUMENTS 4,213,521 7/1980 Modersohn .................. 192/18 R
5,085,305 2/1992 Cheng ........................ 192/69.82
5,699,889 12/1997 Gadd ......................... 192/35

FOREIGN PATENT DOCUMENTS 448046 5/1992 Japan.
5231449 7/1993 Japan.

Primary Examiner—Charles A Marmor
Assistant Examiner—Saúl Rodríguez
Attorney, Agent, or Firm—Arent Fox Kintner Plotkin & Kahn PLLC

[57] ABSTRACT

A two-way clutch comprising an input system rotational member (10) adapted to be rotatably driven by a driving source, an output system rotational member (60, 140) for taking out outwardly a torque transferred from the input system rotational member (10), and a torque transferring member (50, 150a,150b) interposed between the input system rotational member (10) and the output system rotational member (60, 140) for selectively making the two rotational members engage and disengage each other, wherein in order to perform securely torque transfer and cut off between the input and output systems and avoid any influence of an external force applied from the output system during torque transfer, the torque transferring member (50, 150a, 150b) is adapted to transfer torque in both forward and backward rotating directions while it engages the input system rotational member (10) and the output system rotational member (60, 140) and the output system rotational member (60, 140) is adapted to freely rotate only when the torque transferring member (50, 150a, 150b) is released from the output system rotational member (60, 140).

13 Claims, 9 Drawing Sheets

TWO-WAY CLUTCH UNIT

BACKGROUND ART

The present invention relates to a clutch unit which intervenes in a rotating force transmission channel and is able to transmit or interrupt torque, and in particular relates to a clutch unit which is designed so as to transmit torque in a normal or reverse direction from the input system to the output system while a drive source is operating and to enable manual operations of the output system by interrupting torque while the drive source is in pause.

A two-way clutch according to the invention is able to be utilized for a power window of automobile and for an opening and closing mechanism of an electro-slide door, electro-drive curtain, electro-drive shutter, etc. in a one-box passenger car.

For example, an electro-slide door of automobile (one-box passenger car) is usually designed so that rotation of a drive motor is reduced by worm gears and is further transmitted via an electromagnetic clutch. Since the reduction ratio of the worm gears is generally large, it is necessary to provide the same with a means for opening the connection between the drive motor and an output shaft in order to enable manual operations when the drive motor comes to a stop. Therefore, an electromagnetic clutch is caused to intervene therebetween, thereby enabling a manual input, that is, manual door opening and closing, at the output shaft side.

In a case where an electromagnetic clutch is used, there remains a problem in view of reliability in addition to a problem, by which the consumption power is increased and the control system thereof is complicated, because the electromagnetic clutch is electrically controlled.

DISCLOSURE OF INVENTION

It is therefore an object of the invention to provide a two-way clutch which is able to securely transmit and interrupt torque between an input system and an output system and is not influenced by any external force even though the external force is given from the output system side while transmitting torque (that is, does not make any overrunning).

In order to achieve the above object, in one aspect of the invention a two-way clutch unit is constructed so that the same comprises an input system rotating member driven and rotated by a drive source, an output system rotating member for outwardly taking out torque transmitted from the input system rotating member, and a torque transmission member interposed between the rotating members and being selectively engageable with and disengageable from both rotating members, wherein the torque transmission member is able to transmit torque in either of normal or reverse direction when the same is engaged with the input system rotating member, and the output system rotating member is freely rotatable only when the torque transmission member is disengaged from both the rotating members.

In order to transmit torque in either of normal or reverse direction when the torque transmission member is engaged with both the input system rotating member and the output system rotating member, in detail, the first dog is employed at the inner end of the output system rotating member rotatably supported at a stationary member, and simultaneously the second dog which is able to be engaged with the first dog in the circumferential direction thereof is secured at a torque transmission member, thereby constituting a kind of dog clutch. The torque transmission member is fixed in the rotating direction with respect to the input system rotating member, and the same is caused to axially move between an disengageable position where the first dog and the second dog are axially separated from each other and an engageable position where the second dog is engaged with the first dog in the circumferential direction.

A cam mechanism is also provided, which is able to control the above engagement and disengagement of the torque transmission member through relatively angular displacement with respect to the input system rotating member.

The cam mechanism is composed of a first cam member coaxially fitted to the input system rotating member so as to be relatively angularly displaced, a second cam member for converting the displacement of the first cam member in the rotating direction with respect to the input system rotating member to the axial displacement, and a stationary intermediate axis which is rotatably fitted relative to the first cam member and has a viscous fluid filled in the fitted part thereof, whereby the torque transmission member is caused to move to said engageable position by the axial displacement of the second cam member.

In order to convert the displacement of the first cam member in the rotating direction with respect to the input system rotating member to the displacement (cam lift) of the second cam member in the axial direction, for example, a cam surface, the cross-section of which is a V-shaped valley type, is provided on the first cam member and a cam surface, the cross-section of which is a V-shaped ridge type, corresponding to the cam surface of the first cam member is also provided on the second cam member. In this case, if the first cam member takes angular displacement, the V-shaped ridge type cam surface of the second cam member which is in contact with the V-shaped valley type cam surface of the first cam member is pressed in the axial direction of separating from the first cam member upon receiving an axial segmental force.

A two-way clutch unit according to the invention further comprises a first resilient means existing between the second cam member and torque transmission means and for pressing them in a direction of separating both of them from each other and a second resilient means intervening between the torque transmission member and output system rotating member for pressing them in a direction of separating both of them from each other, whereby when the shearing resistance of said viscous fluid exceeds the synthetic spring force of said resilient means, the first cam member is caused to be relatively angularly displaced with respect to the input system rotating member. A resilient means, pneumatic pressure, etc. may be employed in addition to a coil spring as a resilient means. Herein, the viscous fluid constitutes a kind of viscous coupling, and a silicone oil may be listed as one example.

The second cam member and the torque transmission member may be united together, thereby eliminating the first resilient means. In that case, the first cam member is caused to be relatively angularly displaced with respect to the input system rotating member as the shearing resistance of the viscous fluid exceeds the spring force of the second resilient means.

A centering spring for retaining the input system rotating member and first cam member at an appointed relatively angular position may be provided. No relative angular displacement of the first cam member is secured with respect to the input outer ring when the drive source is in pause, thereby causing the displacement of the cam mechanism, that is, the cam lift to be made zero. Thereby, a dog clutch formed between the torque transmission member and the output shaft is released.

In another aspect of the invention, a two-way clutch unit may comprise an input member adapted to be rotated by a drive source, an output member which externally takes out torque transmitted from the input member, and torque transmission members supported on the input member selectively engaged with or disengaged from the output member, wherein the torque transmission members when in engagement with the output member transmits torque in any of the normal and reverse directions and the output member is freely rotatable only when the torque transmission members are in disengagement from the output member.

In order to transmit torque in any of the normal and reverse directions when the torque transmission members are engaged with the input member and output member, concretely axial engaging grooves may be provided on the outer circumferential surface of the output member which is rotatably supported at a stationary member, the torque transmission members being supported on the input member for movement between the disengaged position at which they are radially separated from the outer circumference surface of the output member and the engaged position at which they are in engagement with the engaging grooves of the output member.

Movements of the torque transmission members between the disengaged position and the engaged position may be achieved by, for example, swinging the same in a plane perpendicular to the axis of the input member. It is also possible to cause the torque transmission members to move by shifting the same in the radial direction or the axial direction of the input member.

A cam mechanism may be provided for controlling the abovementioned movements of the torque transmission members through an angular displacement with respect to the input member.

A means for resiliently urging the torque transmission members to the output member may be provided, and the cam mechanism may be composed of a cam member coaxially received in with the input member for angular displacement with respect thereto and a cam formed at a part of the cam member for interposition between the outer circumferential surface of the output member and the torque transmission members, so that the abovementioned movements of the torque transmission members may be controlled by an angular displacement of the cam with respect to the input member.

A two-way clutch unit according to the invention may further comprise a stationary intermediate shaft relatively rotatably fitted to the cam member with a viscous fluid sealed in a space therebetween, and a biasing means for resiliently retaining the input member and the cam member at a predetermined angular position with respect to each other, wherein when the shearing resistance of the viscous fluid exceeds the spring force of the biasing means, the cam member makes an angular displacement with respect to the input member. Not only a spring but also an elastic material, pneumatic pressure, etc. may be used to constitute the biasing means. The viscous fluid constitutes a kind of viscous coupling, and silicone oil may be listed as an example.

When the drive source comes to a stop, the shearing resistance of the viscous fluid is no more effective, resulting in that the angular displacement of the cam member with respect to the input member becomes zero because of the resiliency, or an elastic recovery force, of the biasing means. Resultantly, the cam of cam member is interrupted between the output member and the torque transmission member to disengage the torque transmission member from the engaging groove of the output member. Therefore, the output member is able to be freely rotated by, for example, manual operation.

On the other hand, while the input member is rotated by the drive source, a relatively angular displacement arises between the input member and the cam member due to actions of the shearing resistance of the viscous fluid, resulting in that the cam is retracted from between the outer circumferential surface of the output member and the torque transmission members to thereby allow the torque transmission members to engage with the engaging grooves of the output member.

A stopper may be provided for blocking the movements of the torque transmission members toward the disengaged position when the cam is at the retracted position, so that an engagement of the input member with the output member can be retained even though an external force acts, which tends to rotate the output member faster than the input member during transmission of torque from the input member to the output member, thus preventing the so-called overrunning.

A two-way clutch unit according to the invention is able to automatically interrupt transmission of torque between the input outer ring and the output shaft when a drive motor stops and to securely release the output shaft from the input system. Therefore, if a two-way clutch unit according to the invention is used in, for example, a power transmission system for an electro-slide door, power window, electro-drive curtain, electro-drive shutter, etc. of automobile, it will become possible to manually open and close the slide door, window, curtain, shutter, etc. at the output shaft side when the drive motor stops, whereby these devices will be made more advantageous.

Furthermore, since a two-way clutch unit according to the invention is able to automatically and mechanically transmit and interrupt torque, the same is able to eliminate not only shortcomings which are an increase of the consumption power and a complication of the control system but also a worry about malfunctions of the clutch function due to a failure of the electric system.

Still furthermore, since the torque transmission member is provided with such a function that free rotation of the output system rotating member is permitted only when the torque transmission member is disengaged from the input system and output system rotating members, and torque is transmitted in either of normal or reverse direction when the torque transmission member is engaged with the input system rotating member and the output system rotating member to cause the overrunning of the output system to be controlled with respect to the input system, for example, it is possible to control the closing speed of a slide door in a down slope. Therefore, the two-way clutch unit contributes to improvement of the safety and convenience of an automated door, etc.

Embodiments of the invention will now be described with reference to the accompanying drawings.

BEST MODE FOR CARRYING OUT THE INVENTION

Figure 1A:
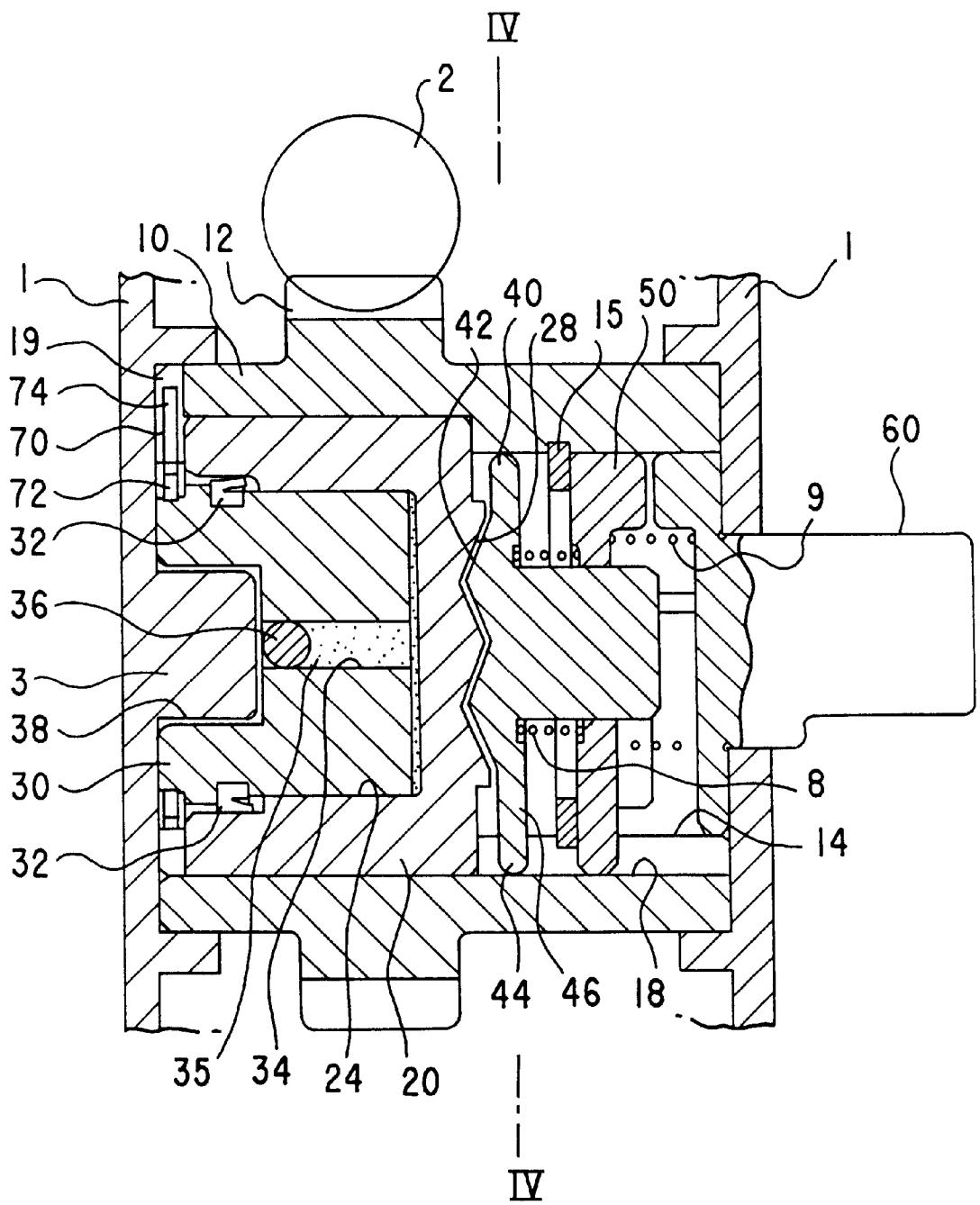
FIG. 1A is a longitudinally sectional view of a two-way clutch unit, showing an embodiment of the invention.

Referring first to the embodiment shown in FIGS. 1A to 6, a two-way clutch unit shown in FIG. 1A is accommodated in a housing (1) which is a stationary member, and the same is provided with an input outer ring (10), which is the input system rotating member driven and rotated by a drive source, and an output shaft (6) which is the output system rotating member to outwardly take out torque transmitted from the input outer ring (10). Furthermore, FIG. 1A is a cross-sectional view taken along the line I—I in FIG. 3.

The input outer ring (10) has a roughly hollow cylindrical shape and has a worm wheel (12) at the outer circumference thereof. The worm wheel (12) constitutes a worm gear in engagement with a worm (2) driven and rotated by a drive motor (not illustrated). A belt type transmission device, etc. may be employed as a power transmission mechanism between a drive source such as the drive motor and the input outer ring (10) in addition to a gear illustrated in the drawing.

Figure 2:
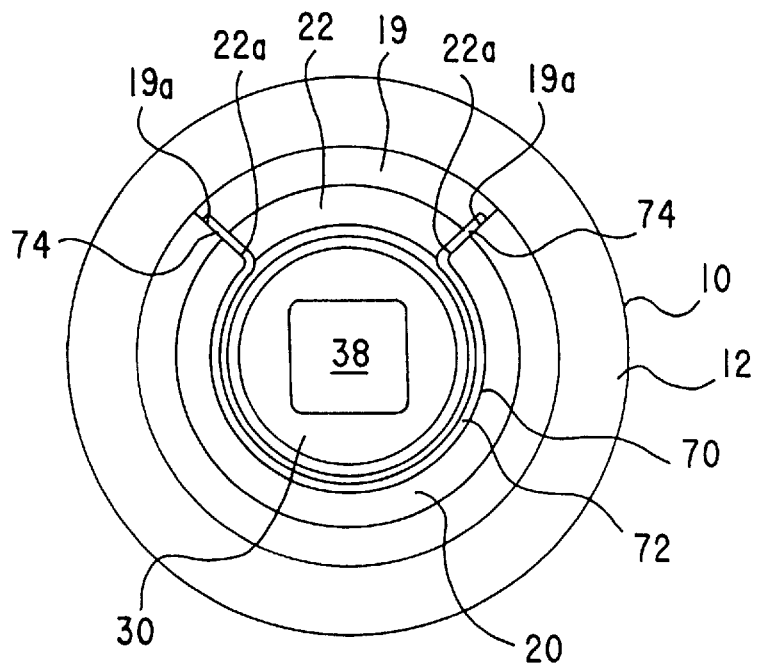
FIG. 2 is the left side elevational view of the clutch unit in FIG. 1A, showing a state that the housing is removed.
Figure 3:
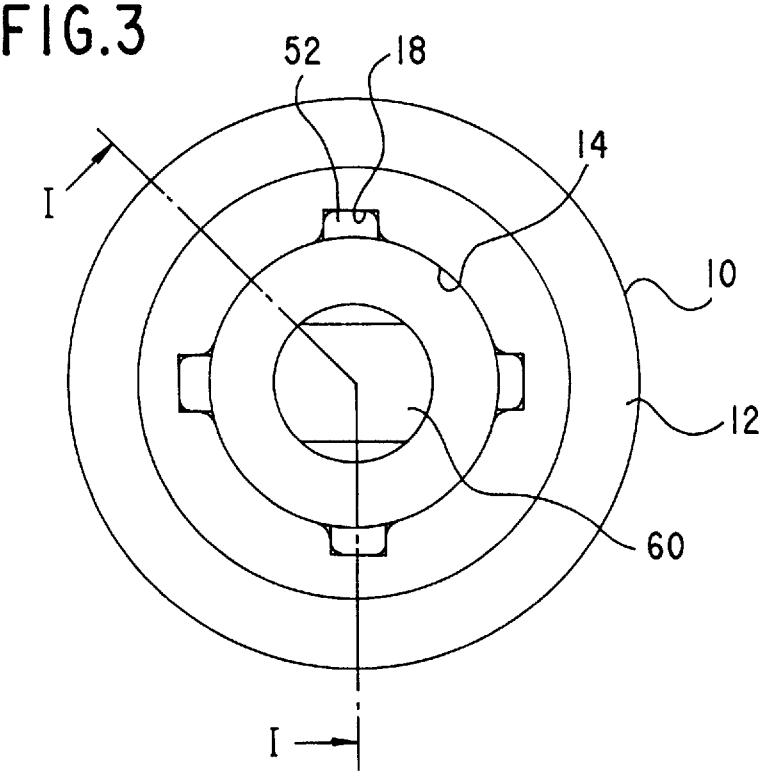
FIG. 3 is the right side elevational view of the clutch unit in FIG. 1A, showing a state that the housing is removed.

An axial hole (14) of the input outer ring (10) is made cylindrical, in which the first cam member (20) is rotatably accommodated. The input outer ring (10) and first cam member (20) are retained at an appointed relative angular position by a centering spring (70). That is, as shown in FIG. 2, the input outer ring (10) has a fan-shaped notch (19) at the end face at the left side in FIG. 1A, and the first cam member (20) also has a fan-shaped notch (22) at the same angular range as that of the notch (19) of the input outer ring (10). The centering spring (70) consists of an arcuate body (72) housed in the vicinity of an opening of a recess (24) of the first cam member (20) and legs (74) radially extending from both ends of the body (72). By each leg (74) being commonly brought into contact with the wall surfaces (19a,22a) faced each other in the circumferential direction of the notches (19, 22), the input outer ring (10) and first cam member (20) are pressed at an appointed relative angular position.

The recess (24) of the first cam member (20) is a cylindrical blind hole extending in the axial direction, which is open to the end face at the left side in FIG. 1A and inwardly has an intermediate axis (30) rotatably housed coaxially. A viscous fluid (35) such as silicone oil, etc. is sealed between the circumferential wall surface of the recess (24) and the outer circumferential surface of the intermediate axis (30), thereby constituting a kind of viscous coupling. That is, An oil seal (32) is attached to the outer circumference of the intermediate axis (30) to prevent the viscous fluid (35) from leaking through an opening of the recess (24), and after the viscous fluid (35) is filled through a through-hole (34) secured at the intermediate axis (30), the through-hole (34) is completely sealed by a filler plug (36). The intermediate axis (30) has a square hole (38) open to the end face at the left side in FIG. 1A, and the square hole (38) is engaged with a protrusion (3) having a square cross-section, which is formed at the housing (1). Therefore, the intermediate axis (30) does not rotate, which constitutes a part of the stationary system.

Figure 4:
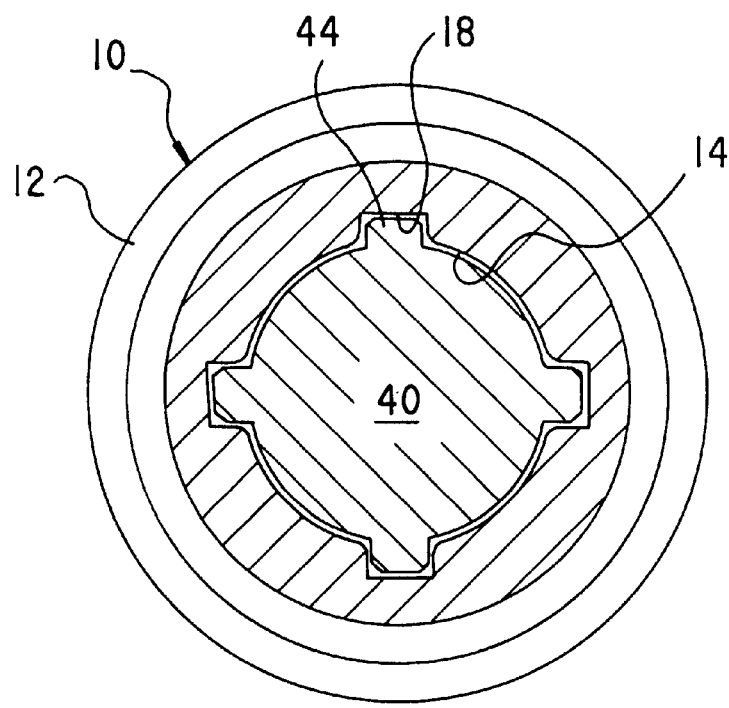
FIG. 4 is a cross-sectional view taken along the line IV—IV in FIG. 1A.

The first cam member (20) has a V-shaped valley type cam surface (28) at the end face opposite to the opening of the axial hole (24). The second cam member (2) having a V-shaped type ridge cam surface corresponding to the cam surface (28) of the first cam member (20) is axially movably accommodated at the other end side of the axial hole (14) of the input outer ring (10), that is, at the right side part in FIG. 1. The first cam member (20) and second cam member (4) constitutes a cam mechanism. As illustrated in FIG. 4, the second cam member (40) has a projection (44) at its outer circumference. The projection (44) is engaged with an axial groove (18) formed on the inner circumference of the axial hole (14) of the input outer ring (10), whereby the second cam member (40) is fixed (turn-stopped) in the rotating direction with respect to the input outer ring (10).

The second cam member (40) has a small-diameter axial part (48) integral with a flange part (46) having a projection (44) formed thereon, and the outer circumference of the small-diameter axial part (48) is slidably fitted into a through-hole (62) of a clutch ring (50) (See FIG. 1A). The clutch ring (50) is disk-shaped, and the outer circumferential face of the clutch ring (50) is axially movably accommodated in the axial hole (14) of the input outer ring (10), and has a projection (54) engageable with the axial groove (18) of the axial hole (14), whereby the clutch ring (50) is fixed (turn-stopped) in the rotating direction with respect to the input outer ring (10). The clutch ring (50) has a dog (56) protruding to the one end face thereof, that is, to the right end face in FIG. 1A (See FIG. 5).

An output shaft (60) is positioned at the outer end part of the axial hole (14) of the input outer ring (10). The output shaft (60) is like a staged circular column, the large-diameter part (62) of which is rotatably fitted into the axial hole (14) of the input outer ring (10), and small-diameter part (64) of which protrudes outwardly, passing through the housing (10). The large-diameter part (62) of the output shaft (60) has a dog (68) protruding to the end face at the side opposite to the clutch ring (60). (See FIG. 5).

Figure 5:
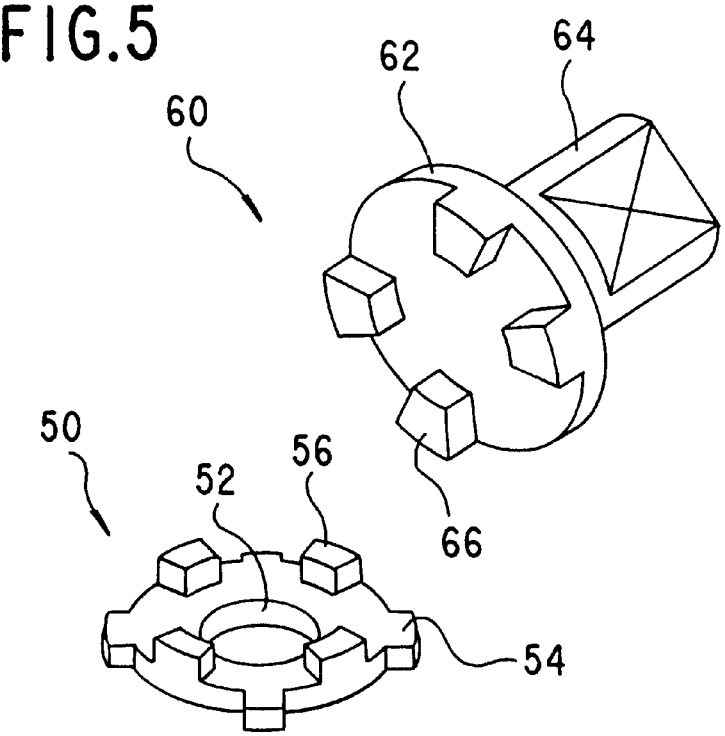
FIG. 5 is a disassembled perspective view of a dog clutch mechanism.
Figure 6:
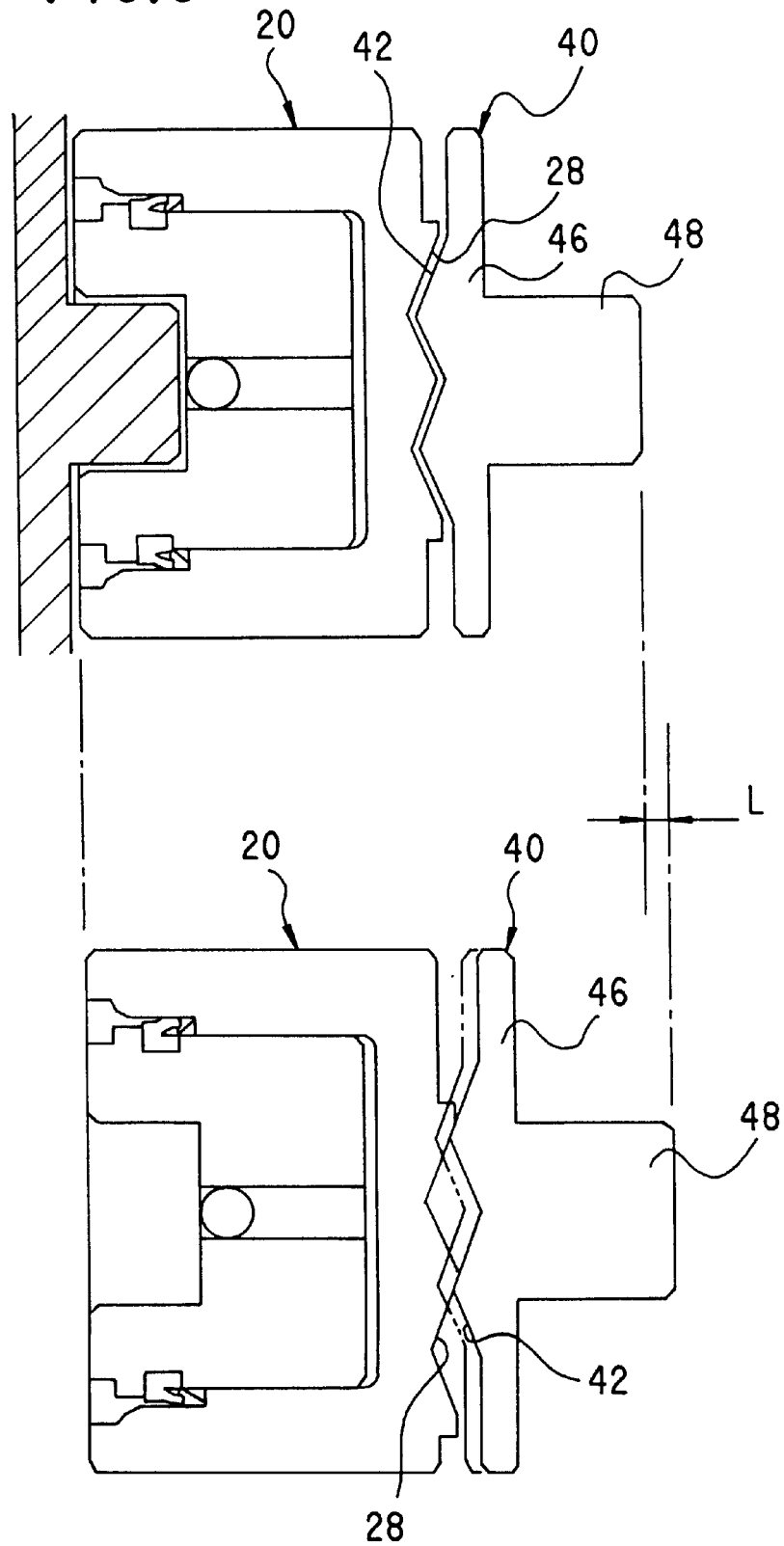
FIG. 6 is a longitudinally sectional view of a cam mechanism.

FIG. 5 illustrates a case where four dogs (56,66) are equidistantly disposed in the circumferential direction on each of the clutch ring (50) and output shaft (60). As been better understood in FIG. 1A and FIG. 5, if the clutch ring (50) axially moves to cause the dogs (56) of the clutch ring (50) to engage with the dogs (66) of the output shaft (60), both of them are made integral in the rotating direction. That is, the clutch ring (50) and output shaft (60) constitute a dog clutch. Therefore, the clutch ring (50) takes roles of both the torque transmission member and clutch member as the functions thereof.

A compression coil spring (8) intervenes between the second cam member (40) and the clutch ring (50) and presses both of them in the direction of separating them from each other. Furthermore, another compression coil spring (9) intervenes between the clutch ring (50) and the output shaft (60) and presses both of them in the direction of separating them from each other. The movement quantity of the clutch ring (50) toward the left in the drawing is controlled by a set ring (15) attached to the axial hole (14) of the input outer ring (10). When the drive motor stops, the spring forces K8,K9 of two compression coil springs (8,9) are set to be K8<K9 so that the clutch ring (50) and output axis (60) are not engaged with each other.

When the drive motor commences to rotate, the rotation thereof is reduced and transmitted to the input outer ring (10) by worm gears (2,12). The first cam member (20) and input outer ring (10) are retained at an appointed relatively angular position (See FIG. 2) by a centering spring (70) and they rotate integrally with each other. Furthermore, since a viscous fluid (35) 18 sealed between the first cam member and the intermediate axis (30) fixed in the rotating direction, the first cam member (20) rotates while receiving a viscous shearing resistance. Reluctantly, if the relationship between the spring force K1 when the centering spring (70) is bent and the viscous resistance K2 due to the viscous fluid becomes K1<K2, the input outer ring (10) and first cam member (20) rotate relative to each other. That is, the first cam member (20) rotates with delay with respect to the input outer ring (10).

When the drive motor stops, the V-shaped valley type cam surface (28) of the first cam member (20) is brought into contact with the V-shaped ridge type cam surface (42) of the second cam member (40) by a spring force of the compression coil spring (8) (See FIG. 1A and FIG. 6), As the drive motor rotates, the input outer ring acoordingly commences to rotate and the first cam member (20) also attempts to rotate in synchronization therewith. However, the rotation of the first cam member (20) delays by the viscous shearing resistance of the viscous part, whereby the first cam member relatively rotates with respect to the input outer ring (10). Furthermore, as the viscous shearing resistance is increased, the V-shaped ridge type cam surface of the second cam member (40) fixed in the circumferential direction (FIG. 2) slips on the V-shaped valley type cam surface (28) of the first cam member (20) and is permitted to move a distance L in the axial direction (See FIG. 6(b)).

The compression coil spring (8,9) is bent by the axial movement of the second cam member (40) to cause the clutch ring (50) to be pressed toward the right side in FIG. 1A, that is, the output shaft (60) side, whereby since the clutch ring (50) axially moves, the dogs (56,66) are engaged with each other soon. That is, the clutch ring (50) rotates together with the input outer ring (10) while being always pressed toward the output shaft (60) side by the compression coil spring (8). On the other hand, the dogs (56,66) are brought into contact with each other since the output shaft (60) stops, and they reaches engagement while they are relatively rotating.

At this time, even though, for example, a slide door which is an object to be driven attempts to move faster due to its self weight than the input system, the speed of the output shaft (60) is not accelerated more than that of the input system (drive motor, input outer ring) since the dogs (56,66) are engaged with each other.

This is an action in a process from the commencement of rotation of the drive motor to the transmission of torque to the output shaft (60).

Next, as the rotation of the input outer ring (10) and first cam member (20) stops by stopping of the drive motor, the viscous shearing resistance of the viscous coupling part disappears. As a result, the first cam member (20) rotates relative to the input outer ring (10) by the resilient righting force of the centering spring (70) plus the resilient righting force of the compression coil springs (8,9), whereby the first cam member (20) returns to the initial relatively angular position, that is, the neutral position (FIG. 1A, FIG. 2). Therefore, the second cam member (40) and clutch ring (50) are pressed back to the left side in FIG. 1 by forces of the abovementloned compression coil springs (8,9) (At this time, the set ring (15) works as a stopper for the clutch ring (50)), whereby the clutch ring (50) is disengaged from the output shaft (60) (that is, the dog clutch is disconnected. Thus, when the drive motor stops its rotation, the output shaft (60) is made free. Therefore, when the drive motor stops, a manual operation is enabled, whereby for example, an electro-slide door can be manually opened and closed.

Hence, if the engagement force of a torque transmission member, that is, the clutch ring (50) with respect to the input outer ring (10) and output shaft (60) is large when the drive motor stops, there is a possibility that the centering of the first cam member (20) can not be quickly carried out with only the resilient righting force of the centering spring (70) (since a certain reaction may usually remain when the drive motor stops, there is a case where the clutch ring (50) can not be disengaged with only the resilient righting force of the centering force (70)). In such a case, there is a reversing means which is able to reverse the input outer ring (10) an appointed quantity from the stop position in order to achieve a quick centering of the first cam member (20). The reversing means may be of any construction if the same brings such a function. For example, such a construction that is able to electrically control the rotation of the drive motor may be employed. Furthermore, although the illustration is omitted, the following mechanical construction may be employed, too. That is, a flywheel is rotatably employed at the axial part which constitutes a part of the input system, wherein one end of the coil spring is connected to the axial part with the other end thereof connected to the flywheel. The axial part is connected to, for example, the output shaft of the drive motor. By the inertia energy of the flywheel being accumulated and released by the coil spring when the drive motor stops, the worm (2) and input outer ring (10) are reversed an appointed quantity. By reversing of the input outer ring (10), the clutch ring (50) is disengaged, whereby a centering of the first cam member (20) can be quickly and securely carried out. Therefore, the output shaft (60) is quickly and securely released from the input system, thereby causing manual opening and closing of an electro-slide door to be smoothly and securely carried out.

Figure 1B:
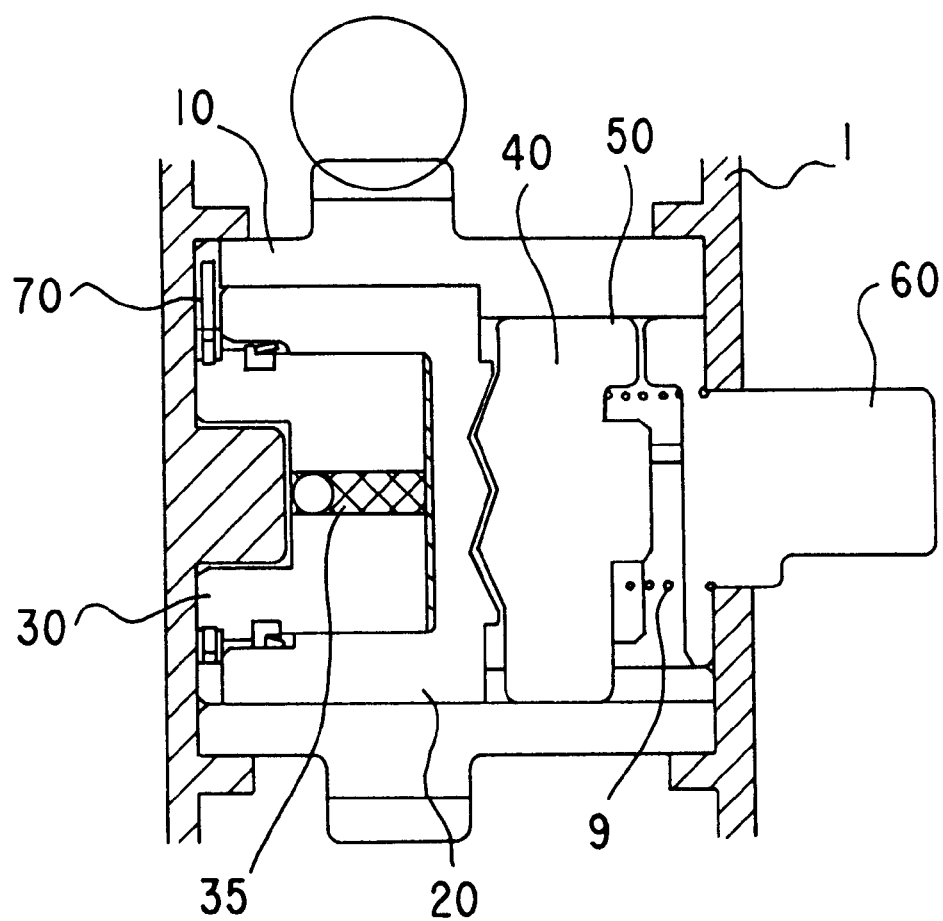
FIG. 1B is a longitudinal sectional view similar to FIG. 1A, showing a modification of the clutch ring.

The second cam member (40) and the clutch ring (50) may be united together as in the case of the modification shown in FIG. 1B, thereby eliminating the compression coil spring (8).

Figure 7:
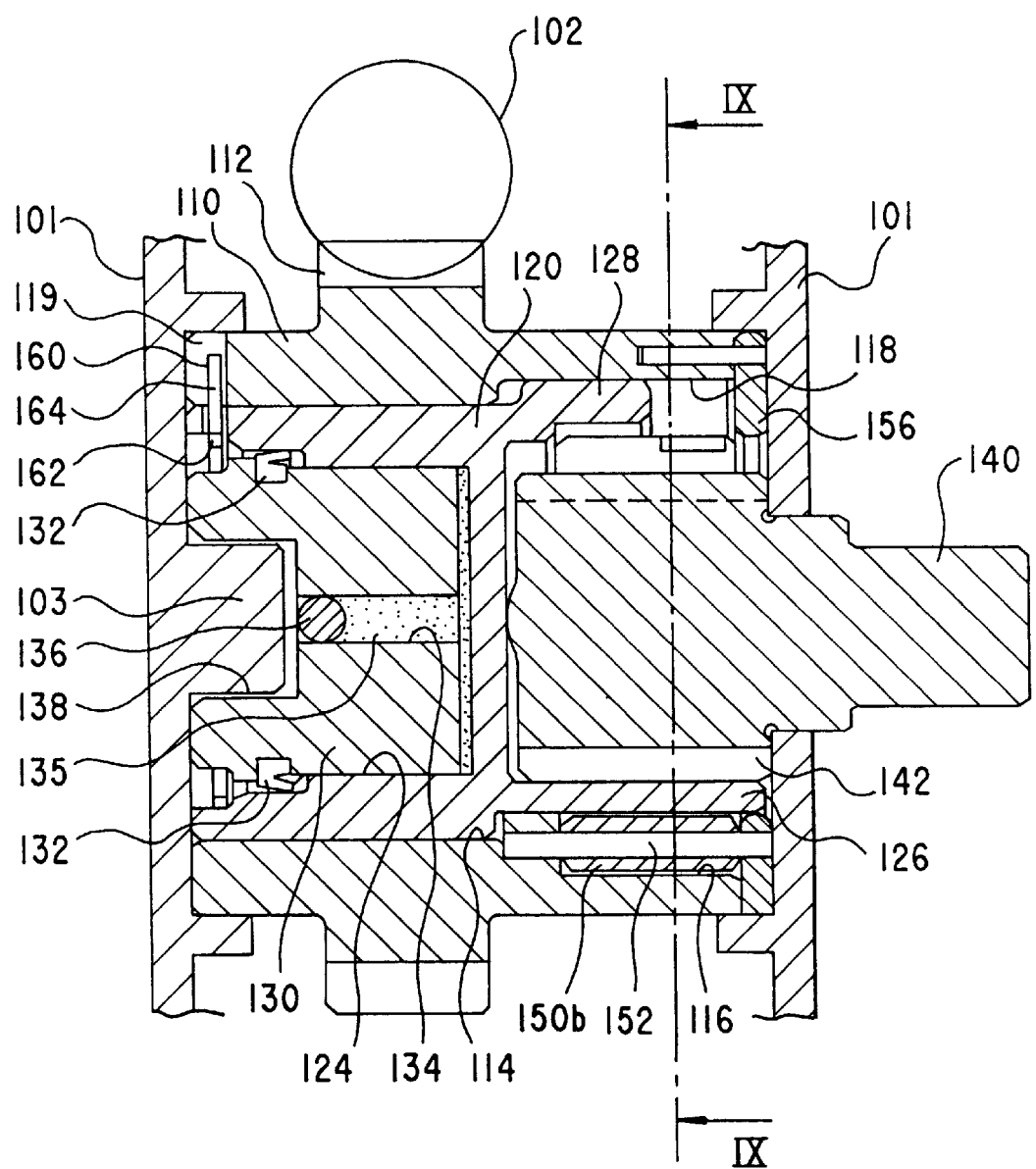
FIG. 7 is a longitudinally cross-sectional view of a two-way clutch unit embodying the invention, showing a different embodiment of the invention.

Another embodiment of the invention shown in FIGS. 7 to 11B will now be described. A two-way clutch unit shown in FIG. 7 is accommodated in a housing (101) which is a stationary member and is comprised of an outer input ring (110) which is an input member driven and rotated by a drive source, and an output shaft (140) which is an output member which externally takes out torque transmitted from the outer input ring (110). FIG. 7 is a cross-sectional view observed from the line VII—VII in FIG. 9.

The outer input ring (110) is roughly hollow cylindrical and has a worm wheel (112) on its outer circumference. The worm wheel (112) is meshed with a worm (102) driven and rotated by a drive motor (not illustrated) to constitute worm gears. Alternately a belt type transmission mechanism may be employed as a power transmission mechanism between the drive source such as a drive motor and the outer input ring.

Figure 8:
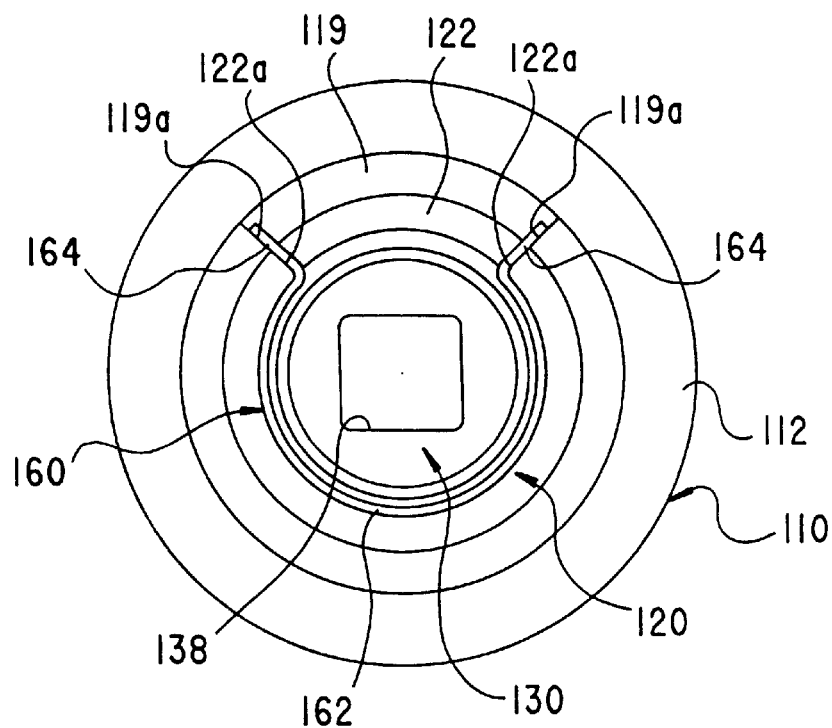
FIG. 8 is a left side end view of the two-way clutch unit shown in FIG. 7 with is housing removed.

The inner circumferential surface of the outer input ring (110) is an axial bore (114) at the left side in FIG. 7. The right side portion is formed in a different diameter cross-sectional hole (116,118) which will be described later. A cam member (120) is rotatably accommodated in the axial bore (114) of the outer input ring (110). The outer input ring (110) and cam member (120) are resiliently retained at a predetermined angular position by a biasing spring (160). As shown in FIG. 8, the outer input ring (110) has an arcuate cut-away portion (119) at the left side end in FIG. 7, and the cam member (120) has an arcuate opening (122) extending to the same angular range as that of the cut-away portion (119) of the outer input ring (110). The biasing spring (160) consists of an arcuate body (162) housed in the vicinity of an opening end of a recess (124) formed in the cam member (120) and legs (164) extending in the radial direction from both ends of the body (162), the respective legs (164) being commonly brought into contact with walls (119a,122a) opposed each other in the circumferential direction so as to resiliently retain the outer input ring (110) and the cam member (120) at a predetermined angular position with respect to each other.

The recess (124) in the cam member (120) is in the form of a cylindrical blind hole extending in the axial direction and is open to the left side end face in FIG. 7 and internally has an intermediate shaft (130) rotatably accommodated coaxially. A viscous fluid (135) such as, silicone oil, is sealed in a space left between the circumferential wall of the recess (124) and the outer circumferential surface of the intermediate shaft (130), thereby constituting a kind of viscous coupling. That is, an oil seal (132) is attached to the outer circumference of the intermediate shaft (130) to prevent leakage of the viscous fluid (135) from the opening of the recess (124) and the viscous fluid (135) is filled therein from a through hole (134) provided at the intermediate shaft (135), the through hole (134) being sealed up with a blind plug (136). The intermediate shaft (130) has a square hole (138) open to the left side end face in FIG. 7, and this square hole (138) is meshed with a projection (103) having a square-shaped cross-section which is formed at the housing (101). Therefore, the intermediate shaft (130) does not rotate but constitutes a part of the stationary system.

Figure 9:
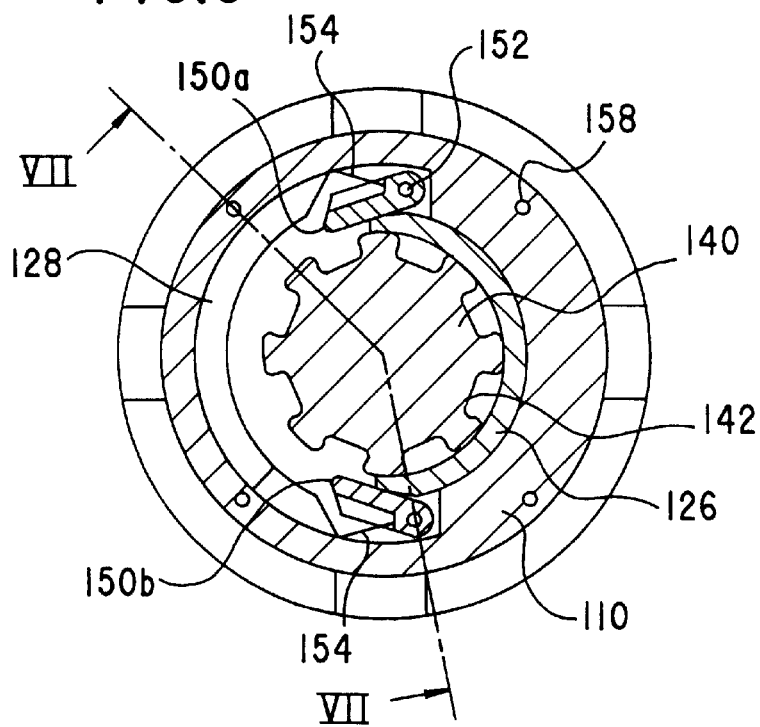
FIG. 9 is a cross-sectional view taken along the line IX—IX in FIG. 7.

As is clear in FIG. 9, the right side portion, in FIG. 7, of the cam member (120) consists of a cylindrical cam (126) extending to roughly a half of the circumference and a stopper (128) extending to roughly the remaining half of the circumference. The inner circumferential surface of the cam (126) and the outer circumferential surface of the output shaft (140) are brought into contact for relative rotation. The output shaft (140) has a plurality of axially extending parallel grooves (142) distributed in the circumferential direction on the outer circumferential surface thereof. The right side end part, in FIG. 7, of the output shaft (140) passes through the housing (101) to protrude outwardly.

In order to accommodate the cam (126) and stopper (128) of the cam member (120), the right side part, in FIG. 7, of the inner circumferential surface of the outer input ring (110) is made up of different diameter portions (116,118); a small diameter portion (116) is brought into contact with the outer circumferential surface of the cam (126), and a large diameter portion (118) is brought into contact with the outer circumferential surface of the stopper (128) (FIG. 9). A pair of vanes (150a,150b) are swingably attached at roughly diametrical positions in the large diameter portion (118). The respective vanes (150a,150b) are swingably supported on a supporting pin (152), and are resiliently urged radially inwardly, i.e. toward the output shaft (140) by springs (154) interposed between the vanes and the inner circumferential surface of the large diameter portion (118). If the vanes (150a,150b) are pressed by the springs (154) to swivel around the restrictive supporting pins (152), the tip ends thereof are placed in the grooves (142) of the output shaft (140). The vanes (150a,150b) are axially positioned by a cover (156) fixed with pins (158) to an end face of the outer input ring (110). The cover (156) also functions as a support for one end side of the supporting pins (152) with the other ends thereof supported at the outer input ring (110).

Since the cam member (120) is retained at the neutral position (FIG. 8, FIG. 9) with respect to the outer input ring (110) by the action of the biasing spring (160) when the drive motor is in hold, the vanes (150a,150b) are kept by the cam (126) in a state where they are out of contact with the output shaft (140), against the resilient force of the springs (154), allowing the output shaft (140) to be freely rotatable.

As the drive motor rotates, the rotation thereof is transmitted at a reduced rate to the outer input ring (120) via the worm gear. Since the cam member (120) and outer input ring (110) are resiliently kept in a predetermined angular position with respect to each other by the biasing spring (160), the cam member (120) tends to rotate together with the outer input ring (110). However, the cam member (120) is subject to a viscous shearing resistance since the viscous fluid (135) is sealed in the space between the cam member (120) and the intermediate shaft (130) which is fixed in the rotation direction with respect to the housing (101) and as the viscous shearing resistance K2 due to the viscous fluid (135) exceeds the spring force K1 caused by deflection of the biasing spring (160) (K1<K2), a relative angular displacement arises between the outer input ring (110) and the cam member (120).

Figure 10A:
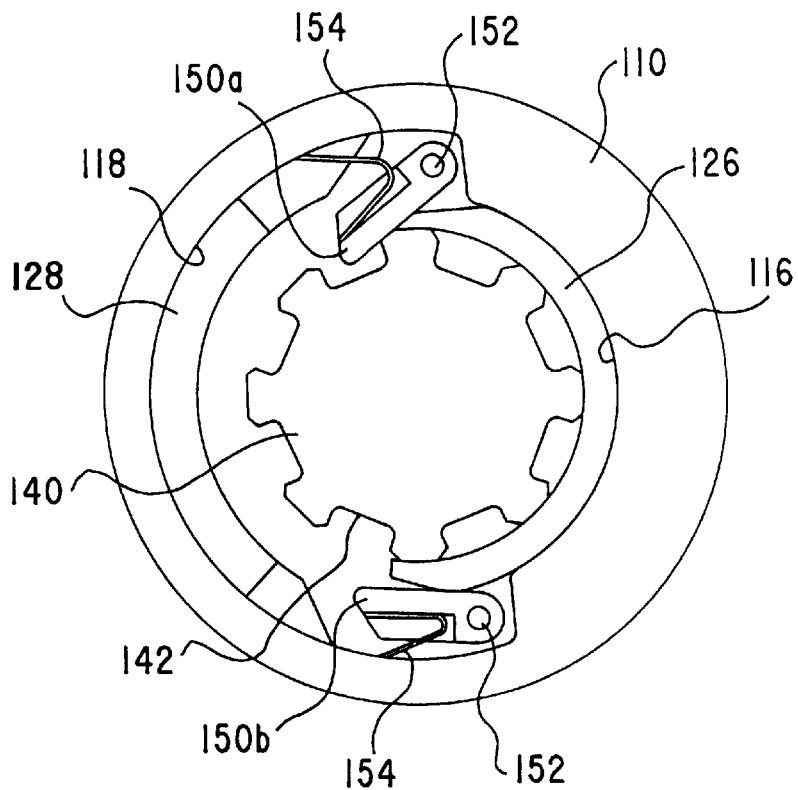
FIGS. 10A and 10B are cross-sectional views similar to FIG. 9, illustrating the actions of a cam mechanism.
Figure 10B:
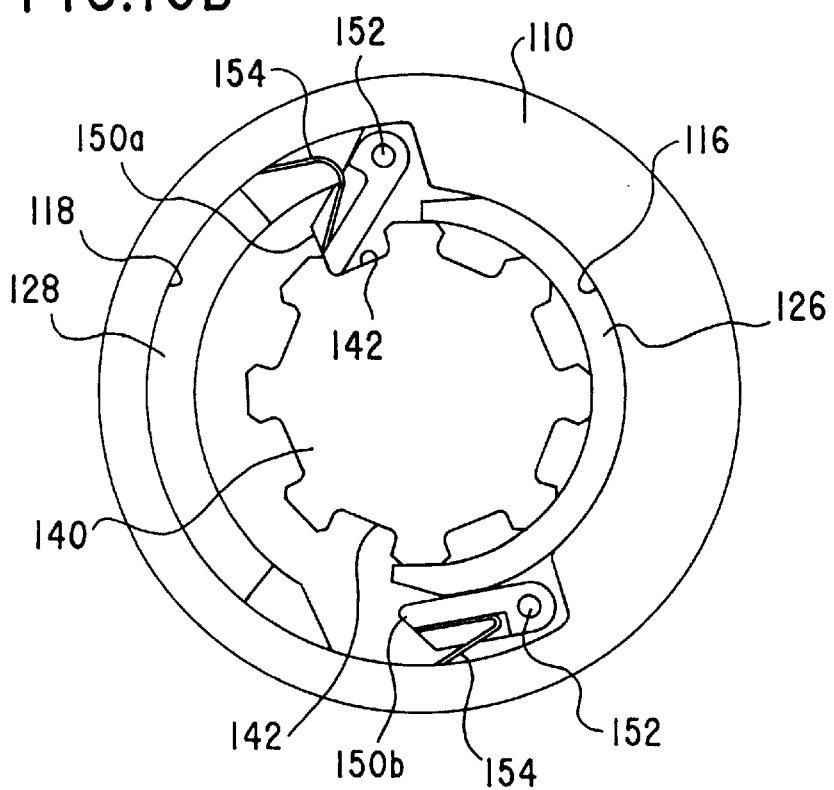

As the viscous resistance further increases, the angular displacement of the cam member (120) with respect to the outer input ring (110) is increased. Reluctantly, as shown in FIG. 10A, on one side, the cam (126) is interposed between the output shaft (140) and the vane (150b), thereby causing the vane (150b) to swivel outwardly in the radial direction against the spring (154), and on the other side the cam is retracted from between the output shaft (140) and the vane (150a), thereby causing the spring (154) to urge the vane (150a) toward the output shaft (140) side. Soon after, as the relative angular displacement between the outer input ring (110) and the cam member (120) increases, one vane (150b) is, as shown in FIG. 10B, completely housed between the outer circumferential surface of the cam member (120) and the inner circumferential surface of the outer input ring (110) while the other vane (150a) has its tip end inserted into the groove (142) of the output shaft (140) (FIG. 11A), whereby torque is transmitted from the outer input ring (110) to the output shaft (140). in this meaning, the vanes (150a,150b) are in a form of the torque transmission member.

Figure 11A:
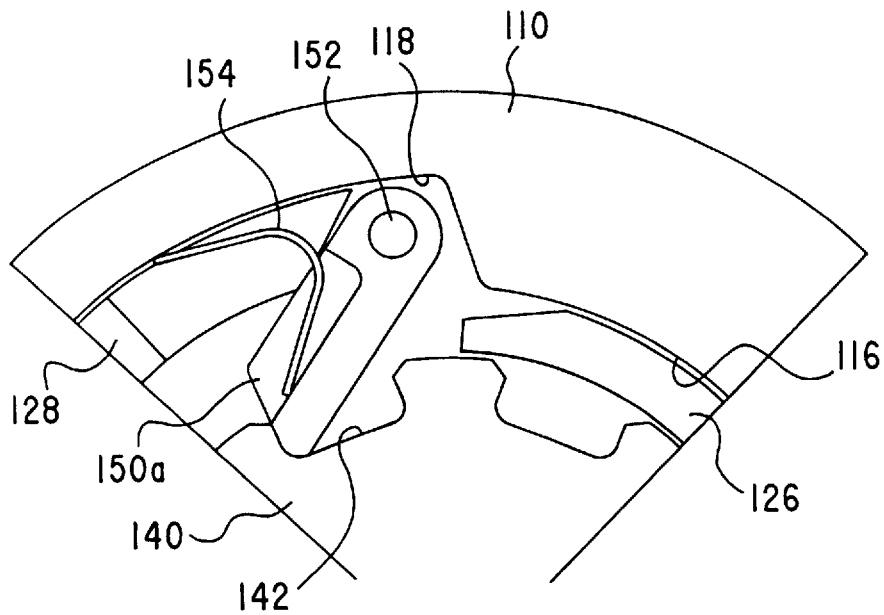
FIGS. 11A and 11B are enlarged views of a vane portion.
Figure 11B:
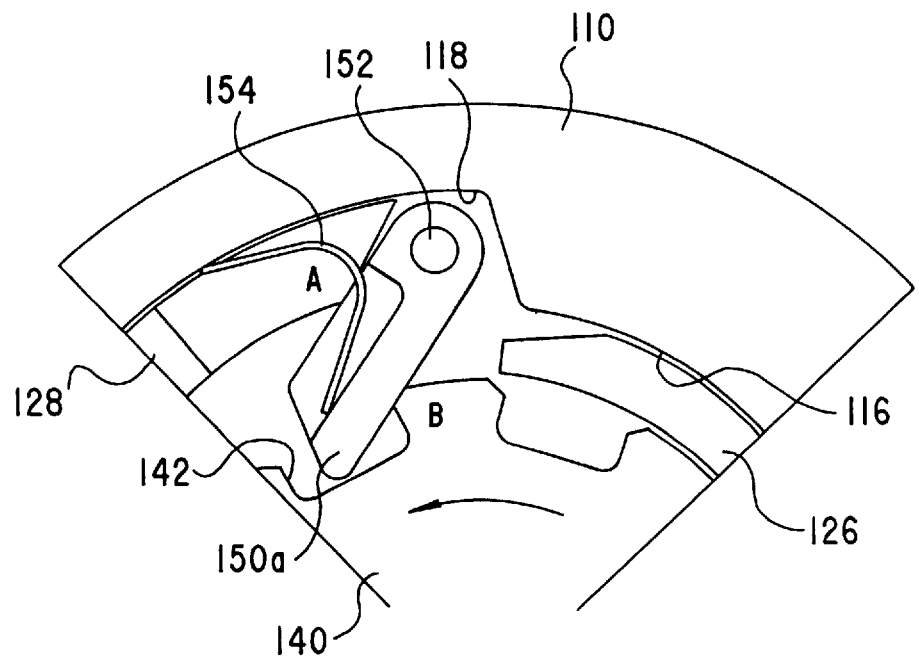

At this time, as shown in FIG. 11B, if the output shaft (140) is caused to rotate in the direction of the arrow faster than the outer input ring (110) in a case where, for example, a sliding door is apt to move faster than the drive motor under the influence of gravity, the stopper (128) is effective to avoid such overrunning. That is, the vane (150a) is put between the point A of the stopper (128) and the point B of the output shaft (140), preventing the output shaft (140) from idle run even though the same is apt to run in the same direction as that of the outer input ring (110). Accordingly, the speed of the output shaft (120) never increases more than the speed of the drive motor (outer input ring).

This is the action in the process from starting of the drive motor till transmission of torque onto the output shaft (140).

Next, as the drive motor stops to cause the outer input ring (110) and cam member (120) to stop their rotations, no viscous shearing resistance arises at the viscous portion. Resultantly, the cam member (120) rotates in the reverse direction due to the resiliency of the biasing spring (160), so that the vane (150a) is pushed up onto the outer circumferential surface of the cam member (120) to assume its initial, or neutral, position where it is separated from the output shaft (140). Thus, if the drive motor stops rotating, the output shaft (140) is made free. Therefore, when the drive motor stops, the output shaft (140) can be freely rotated, for example, it is possible to manually open and close an electro-drive sliding door.

If the engaging force of the torque transmission members, that is, the vanes (150a, 150b) in the case of the illustrated embodiment, with respect to the output shaft (140) is strong when the drive motor stops, there is a possibility that centering of the cam member (120) is not quickly carried out with only the resiliency of the centering spring (160) (since usually a certain reaction force remains when the drive motor stops, there is a case where the vanes (150a,150b) do not come out of engagement with only the resiliency of the centering spring (160) alone. In such a case, a reversing means may be provided to achieve a quick centering of the cam member (120) by reversing the outer input ring (110) by an predetermined amount from the stop position. As far as the reversing means has such a function, any construction may be acceptable. For example, such a construction where the rotations of the drive motor are electrically controlled may be employed. Furthermore, although the illustration is omitted, the following mechanism may be also employed. That is, a fly wheel is rotatably mounted at the axial part which constitutes a part of the input system, one end of a coil spring is connected to the axial part, and the other end thereof is connected to the flywheel. The axial part is connected to, for example, the output shaft of the drive motor, wherein by the inertia energy of the flywheel being accumulated and released by the coil spring when the drive motor stops, the worm (102) (FIG. 1) and accordingly the outer input ring (110) are reversed by a predetermined amount. As a result, the vanes (150a,150b) come out of engagement, whereupon the cam member (120) is quickly and securely centered. Therefore, the output shaft (140) is quickly and securely released from the input system, which ensures manual opening and closing of an electro-drive sliding door equipped with the clutch unit in a smooth and reliable manner.

We claim:

1. A two-way clutch unit comprising an input system rotating member driven and rotated by a drive source, an output system rotating member for outwardly taking out torque transmitted from said input system rotating member, a torque transmission member interposed between said rotating members and being selectively engageable with and disengageable from both rotating members, and a cam mechanism for controlling said engagement and disengagement of said torque transmission member through relative angular displacement with respect to said input system rotating member, said cam mechanism being coupled to said input system rotating member using shearing resistance of a viscous fluid therebetween, wherein the torque transmission member is able to transmit torque in either of normal or reverse direction when the same is engaged with said input system rotating member, and said output system rotating member is freely rotatable only when the torque transmission member is disengaged from both the rotating members.

2. A two-way clutch unit as set forth in claim 1, wherein said output system rotating member has a first dog at the inner end and is rotatably supported at a stationary member, said torque transmission member has a second dog, is fixed in the circumferential direction with respect to said input system rotating member, and is able to axially move between the disengageable position where the second dog is axially apart from the first dog and the engageable position where the second dog is circumferentially engageable with the first dog.

3. A two-way clutch unit as set forth in claim 2, further comprising a centering spring for retaining the input system rotating member and first cam member at an appointed relatively angular position.

4. A two-way clutch unit comprising an input system rotating member driven and rotated by a drive source, an output system rotating member for outwardly taking out torque transmitted from said input system rotating member, a torque transmission member interposed between said rotating members and being selectively engageable with and disengageable from both rotating members, and a cam mechanism for controlling said engagement and disengagement of said torque transmission member through relative angular displacement with respect to said input system rotating member, the torque transmission member being able to transmit torque in either of normal or reverse direction when the same is engaged with said input system rotating member, said output system rotating member being freely rotatable only when the torque transmission member is disengaged from both the rotating members, said output system rotating member having a first dog at the inner end and being rotatably supported at a stationary member, said torque transmission member having a second dog, being fixed in the circumferential direction with respect to said input system rotating member, and being able to axially move between the disengageable position where the second dog is axially apart from the first dog and the engageable position where the second dog is circumferentially engageable with the first dog, wherein said cam mechanism is composed of a first cam member coaxially fitted to the input system rotating member so as to be relatively angularly displaced, a second cam member for converting the displacement of the first cam member in the rotating direction with respect to the input system rotating member to the axial displacement, and a stationary intermediate axis which is rotatably fitted relative to the first cam member and has a viscous fluid filled in the fitted part thereof, wherein the torque transmission member is caused to move to said engageable position by the axial displacement of the second cam member.

5. A two-way clutch unit as set forth in claim 4, wherein the first cam member has a cam surface, the cross-section of which is a V-shaped valley type, and the second cam member has a cam surface, the cross-section of which is a V-shaped ridge type, corresponding to the cam surface of the first cam member.

6. A two-way clutch unit as set forth in claim 4, further comprising a first resilient means existing between the second cam member and torque transmission means and for pressing them in a direction of separating both of them from each other and a second resilient means intervening between the torque transmission member and output system rotating member for pressing them in a direction of separating both of them from each other, wherein when the shearing resistance of said viscous fluid exceeds the synthetic spring force of said resilient means, the first cam member is relatively angularly displaced with respect to the input system rotating member.

7. A two-way clutch unit as set forth in claim 4, wherein the second cam member and the torque transmission member are united together with a resilient means disposed between the torque transmission member and the output system rotating member, the resilient means urging the torque transmission member and the output system rotating member in opposite directions to each other so as to allow the first cam member to be angularly displaced with respect to the input system rotating member as the shearing resistance of the viscous fluid exceeds the spring force of the resilient means.

8. A two-way clutch unit comprising an input member adapted to be rotated by a drive source, an output member which externally takes out torque transmitted from said input member, torque transmission members supported on said input member and selectively engageable with and disengageable from said output member, and a cam mechanism for controlling said engagement and disengagement of said torque transmission members through relative angular displacement with respect to said input member, said cam mechanism being coupled to said input member using shearing resistance of a viscous fluid therebetween; wherein said torque transmission members when in engagement with said output member transmit torque in any of normal and reverse directions and said output member is freely rotatable only when said torque transmission members are in disengagement from said output member.

9. A two-way clutch unit as set forth in claim 8, wherein said output member has an axial engagement groove in an outer circumferential surface thereof and is rotatably supported on a stationary member, and said torque transmission members are supported on the input member for movement between a disengagement position at which the torque transmission members are radially separated from the outer circumferential surface of the output member and an engaged position at which the torque transmission members are in engagement with the engagement groove of the output member.

10. A two-way clutch unit as set forth in claim 9, wherein said torque transmission members movable between the disengaged position and the engaged position by swinging in a plane perpendicular to the axis of the input member.

11. A two-way clutch unit as set forth in claim 9, further including a resilient means for urging said torque transmission members toward the output member, wherein said cam mechanism is composed of a cam member coaxially received in the input member for angular displacement with respect thereto and a cam formed at a part of said cam member for interposition between the outer circumferential surface of the output member and the torque transmission members, wherein the movements of said torque transmission members are controlled by an angular displacement of said cam with respect to the input member.

12. A two-way clutch unit as set forth in claim 11, further including a stopper means for blocking the movement of said torque transmission members toward the disengagement position when said cam is retracted from between the output shaft and the torque transmission members so that said torque transmission members are located at the engagement position.

13. A two-way clutch unit as set forth in claim 9, further including a stationary intermediate shaft relatively rotatably fitted to said cam member, a viscous fluid sealed in a space between said intermediate shaft and cam member, and a biasing means for resiliently retaining the input member and the cam member at a predetermined angular position with respect to each other, wherein the cam member makes an angular displacement with respect to the input member when a shearing resistance of said viscous fluid exceeds a spring force of said centering means.

* * * * *